United States Patent Office 3,482,990
Patented Dec. 9, 1969

3,482,990
FREEZE-DRYING OF FOAMED AROMATIC MATERIAL
Richard A. Pfluger, Maplewood, N.J., and Marvin Schulman, Monroe, and Martin S. Hertzendorf, Yonkers, N.Y., assignors to General Foods Corporation, White Plains, N.Y., a corporation of Delaware
No Drawing. Continuation of application Ser. No. 520,347, Jan. 13, 1966. This application Feb. 10, 1969, Ser. No. 800,353
Int. Cl. A23f *1/08;* F26b *5/06*
U.S. Cl. 99—71                                                                 10 Claims

ABSTRACT OF THE DISCLOSURE

Coffee extract is concentrated, foamed and frozen in a manner which avoids evaporative cooling, and then freeze-dried.

---

This application is a continuation of Ser. No. 520,347 filed Jan. 13, 1966 (now abandoned) which was a continuation-in-part of Ser. No. 309,410 filed Sept. 17, 1963 now abandoned which was a continuation-in-part of Ser. No. 98,007 filed Mar. 24, 1961 (now abandoned).

This invention relates to an improved process for foam-freezing aromatic liquid materials prior to freeze-drying.

In the past, liquid extracts such as coffee, have been foamed, frozen and then freeze-dried. Foam-freezing has the advantage that the surface area exposed for drying is greatly increased thus accelerating the rate of freeze-drying. However, conventional techniques of foaming aromatic liquids have the disadvantage that an appreciable loss of volatile aromatics occurs during foaming. A typical method used has been the spraying of the aromatic liquid into a vacuum chamber wherein the liquid foams and freezes due to the cooling effect of the evaporating water. This causes loss of volatile, water-miscible aromatics in the evaporating water.

The prior art methods of foaming aromatic liquids prior to freeze-drying leave a partially dearomatized product for the freeze-drying operation thus giving an inferior product.

This invention is based on the discovery that an improved freeze-dried product can be produced by retaining the volatile aromatics during the foam-freezing operation. This is done in a simple manner by avoiding evaporative cooling of the extract or juice during the foaming and freezing step and then freeze-drying the frozen foam.

Specifically, the present process involves foaming the aromatic aqueous liquid to a substantial overrun while avoiding evaporative cooling of said aqueous liquid, freezing said foam to below its eutectic point while avoiding evaporation of the aqueous liquid, subliming said aqueous liquid from the frozen foam to reduce the moisture of the foam to at least 10–20%, and further drying the foam to a stable moisture content.

Evaporative cooling can be avoided by incorporating solid $CO_2$ (Dry Ice) in the aromatic liquid causing a one step foaming and freezing. Alternatively, a gas can be whipped into the liquid to create a foam and the foam then frozen while keeping the liquid under substantially atmospheric conditions. The gas may be carbon dioxide, nitrogen, nitrous oxide, air or any other gas, preferably a gas which does not react with or is inert to the material being dried. Similarly, a refrigerated gas such as air or nitrogen, can be introduced into the aromatic liquid to cause freezing thereof incident to foaming the material. The fozen foam preferably has a high overrun whereby the density of the solution or suspension is changed from above 1.0 gm./cc. to between 0.1–0.7 gm./cc. Any method of foam-freezing can be used as long as evaporative cooling is avoided and substantially all the aromas are retained in the frozen foam.

Foaming can be considerably increased by concentrating the coffee or other aromatic liquid to a relatively high solids content (between 35% and 60% solids) prior to incorporation of gas into the liquid. If volatile aromas are to be added to the extract, the aromas should be added at this stage of the process, preferably after concentration and before freeze-drying. These volatile aromas are well known in the art and include volatile atmospheric steam aromas similar to those described in Nutting 2,562,206 and Mahlmann 3,132,947, vacuum steam aromas similar to those described in Mook et al. 3,035,922 and dry vacuum distilled aromas similar to those described in Lemonnier 2,680,687.

The foam is solidified by subjecting it to below freezing temperatures which cool the foam to below the eutectic point of the particular aromatic material. This may be done by contacting the foam with a cold heat exchange surface or by immersion in a low temperature freezing liquid such as liquid nitrogen or liquid air. It is necessary that the foam, once solidified, be kept in a frozen state during subsequent processing and drying.

"Freeze-drying" as used herein means sublimation of water from the product to be dried and includes vacuum freeze-drying as that term is commonly understood in the art and drying under atmospheric pressures by the employment of a high volume of recirculating dry gas such as air, helium, nitrogen, etc. A procedure for vacuum freeze-drying the foamy mass produced in accordance with the present invention may be that taught in U.S. Patent No. 2,292,447 to J. L. Irwin, Jr. A procedure for atmospheric freeze-drying the foam produced in accordance with the present invention is described in U.S. Patent No. 3,096,163 to H. T. Meryman.

Advantageously, in following the teachings of the present process either in a vacuum freeze-drying process or in an atmospheric freeze-drying process, the frozen foam may be arranged for either a batch or continuous process. The frozen foam can be transferred from one food handling station to another, deposited in trays or continuous belts, superposed in spaced relation to one another or otherwise arranged in the freeze-drying zone. In the case of a vacuum freeze-drying operation, the frozen foams may be placed on trays which are deposited onto spaced heating shelves according to the manner of Irwin, Jr. The frozen foam is the vacuum freeze-dried at a pressure of less than 500 microns and a final product temperature of less than 110° F. In the case of an atmospheric freeze-drying operation, the frozen foam can be stacked one upon the other on foraminous members which permit circulation of the cold drying gas through the frozen material. Regardless of the method employed, it is imperative that the temperature of the foam be maintained below its eutectic temperature or solidification point in order to avoid melting or softening of the product and consequent "stripping off" of volatiles. Such conditions should be followed until the moisture content of the foam has been reduced to a point where it has lost all of its free water (that water which is frozen in the form of pure ice crystals). At this point, the partially dried material is in the neighborhood of 10–20% average moisture.

The invention will now be more fully described by reference to the following examples:

EXAMPLE I

Roasted coffee extract at 40° F. and having a solids content of 27% is whipped in a chilled Hobart mixer having a wire whip agitator to a foam density of 0.22 gm./cc. This foam is then extruded in elongated ¼" diameter ribbon-like strands onto a table of "Dry Ice" (frozen $CO_2$) whereon the strands are frozen and carried down to a product temperature of below —50° F. These frozen strands are then broken into approximately ¾″ lengths and dried in a 2″ bed by circulation of dry air through the bed in a downward direction. Temperature of the air was —10° F. and it circulated at a velocity of 675 ft. per minute, the air having a dew point entering the bed of —36° F. After a period of 3 hours the strands were found to have a moisture content of about 7%, the pieces were ground to particle size of about 200 microns, and then further dried to about 3% moisture. The dried coffee reconstituted to an aromatic cup of coffee.

EXAMPLE II

Chilled roasted coffee extract (40° F.) having a 30% solids content and containing 1% expressed coffee oil and 0.5 of steam distilled coffee aroma (recovered in the manner taught in U.S. Patent No. 2,562,206 to Nutting) was placed in an autoclave under a carbon dioxide gas headspace pressure of about 700 p.s.i.g. The pressurized coffee extract was then discharged from the autoclave by means of a valve communicating with a ⅛″ nozzle through which the pressurized extract issued continuously in the form of a foam. The nozzle was submerged in a liquid nitrogen bath which instantly froze the foam into ribbons. The frozen ribbons floated to the surface of the bath and were then atmospherically freeze-dried. This was done by loading the frozen foam to a 4″ depth in the form of a bed supported on a wire mesh screen. Dehydration was carried out by recirculating dry air at a temperature of —10° F. through the bed for a period of 15 hours, followed by 2 hours of dehydration at an air temperature of 0° F. and concluded by 2 hours of dehydration at an air temperature about 12° F. to produce a cellular porous product having 7.5% moisture Velocity of the drying air throughout the operation was 500 feet per minute measured downstream from the bed, the air being circulated downwardly through the bed and the stream being recirculated after conditioning so as to assure that the air had a dew point upon entering the dehydration chamber in the neighborhood of —65° F. The product reconstituted similar to the Example I product gave an improved flavor and aroma.

EXAMPLE III

The chilled coffee extract of Example II was fed to an elongated auger screw chamber adapted to retain the extract therein while it foamed under the influence of chopped "Dry Ice". About 1 part by volume of chopped "Dry Ice" was fed through a suitable hopper to the advancing flights of the rotating screw for each 2 parts by volume of extract fed to the screw. The mixture of "Dry Ice" and extract was agitated to avoid localized freezing and foamed due to sublimation of the "Dry Ice" in the extract. The foamed extract then issued through a nozzle in the form of continuous strips of foamed ribbon which were frozen by depositing the ribbons upon a chilled heat exchange belt having a surface temperature of —30° F. The frozen ribbons were placed on spaced heating shelves vacuum freeze-dried by using individual trays. The trays were loaded to a 1″ bed depth. A vacuum of approximately 150 microns (Hg) was then drawn and the heat controlled in the initial stage of the operation to assure a product temperature of below —10° F. After 7 hours in this vacuum chamber the product was dehydrated to a moisture content of about 15% whereafter the temperature of the product was slowly raised to 80° F. for an additional 5 hours to produce a dried product having a moisture content of 2%. These dried extrudates had a porous texture, could be granulated to any desired particle size, and upon reconstitution provided a most flavorful cup flavor and aroma.

While this invention has been described by specific examples, reference should be had to the appended claims for a definition of its scope.

What is claimed is:

1. An improved process for minimizing loss of volatiles during freeze-drying of coffee extract which comprises obtaining coffee extract, concentrating said extract to a higher solids level of at least 35%, foaming said concentrated extract to a substantial overrun by injection of a gas into said extract at at least atmospheric pressure to thereby avoid evaporative cooling due to evaporation of water in said extract during said foaming, freezing said foam to below its eutectic point at at least atmospheric pressure while avoiding evaporative cooling, and freeze-drying said extract at below the eutectic temperature of said extract.

2. The process of claim 1 wherein the extract is concentrated to between 35% and 60% soluble solids prior to the foaming step.

3. The process of claim 2 wherein the concentrated extract is foamed to an overrun density of between 0.1 to 0.7 gm./cc.

4. The process of claim 2 wherein the frozen foam is vacuum freeze-dried at a pressure of less than 500 microns and a final product temperature of less than 110° F.

5. The process of claim 2 wherein the frozen foam is freeze-dried under atmospheric conditions.

6. The process of claim 3 wherein the frozen foam is vacuum freeze-dried at a pressure of less than 500 microns and a final product temperature of less than 110° F.

7. The process of claim 3 wherein the frozen foam is freeze-dried under atmospheric conditions.

8. The process of claim 4 wherein the concentrated extract is foamed by injection of said gas into said extract at above atmospheric pressure and then releasing the gasified extract to atmospheric pressure.

9. The process of claim 8 wherein said gas is carbon dioxide.

10. The process of claim 8 wherein said gas is nitrogen.

References Cited

UNITED STATES PATENTS

| | | | |
|---|---|---|---|
| 1,970,956 | 8/1934 | Elser | 99—199 |
| 2,292,447 | 8/1942 | Irwin | 99—199 |
| 2,431,496 | 11/1947 | Natelson | 99—71 |
| 2,858,226 | 10/1958 | Kaufman et al. | 99—206 |
| 2,976,158 | 3/1961 | Morgan et al. | 99—199 |
| 3,096,163 | 7/1963 | Meryman | 34—43 |
| 3,170,803 | 2/1965 | Morgan et al. | 99—199 |

MAURICE W. GREENSTEIN, Primary Examiner

U.S. Cl. X.R.

99—77, 199; 34—5